United States Patent [19]

Berzins et al.

[11] Patent Number: 5,112,702
[45] Date of Patent: May 12, 1992

[54] ELECTROCHEMICAL SYNTHESIS OF $H_2O_2$

[75] Inventors: Talvildis Berzins, Kennett Square, Pa.; Lawrence W. Gosser, Wilmington, Del.

[73] Assignee: E. I. du Pont de Nemours and Company, Wilmington, Del.

[21] Appl. No.: 636,868

[22] Filed: Dec. 31, 1990

Related U.S. Application Data

[63] Continuation-in-part of Ser. No. 495,674, Mar. 19, 1990, abandoned.

[51] Int. Cl.$^5$ .................. C25B 1/30; H01M 8/06
[52] U.S. Cl. ....................... 429/17; 204/59 R; 204/84; 429/19
[58] Field of Search ................... 204/59 R, 84

[56] References Cited

PUBLICATIONS

K. Otsuka et al, "One Step Synthesis of Hydrogen Peroxide Through Fuel Cell Reaction", *Electrochimica Acta*, vol. 35, No. 2, pp. 319–322 (Feb. 1990).

*Primary Examiner*—Wayne A. Langel

[57] ABSTRACT

This invention concerns improved processes for the synthesis of $H_2O_2$ by means of the electrochemical reduction of oxygen in the presence of acid and halide, preferably bromide, conducted in an electrolytic cell or in the cathode compartment of a fuel cell. The processes described herein permit production of hydrogen peroxide in commercially useful concentrations.

46 Claims, No Drawings

ELECTROCHEMICAL SYNTHESIS OF $H_2O_2$

CROSS-REFERENCE TO RELATED APPLICATION

This application is a continuation-in-part of application Ser. No. 07/495,674, filed Mar. 19, 1990 abandoned.

BACKGROUND OF THE INVENTION

1. Field of the Invention

This invention concerns improved processes for the synthesis of $H_2O_2$ by means of the electrochemical reduction of oxygen in the presence of an acid and halide, preferably bromide, in an electrolytic cell or in the cathode compartment of a fuel cell. The processes described herein permit production of hydrogen peroxide in commercially useful concentrations.

2. Background Art

The literature is replete with publications concerning the reduction of oxygen to water or to $H_2O_2$. The extensive list of the publications is at least partially due to the interest in developing fuel cells. However, the goal of the fuel cell work has been the direct reduction of oxygen to water without the intermediate production of $H_2O_2$. The problem addressed herein is the maximization of the production of $H_2O_2$. One persistent problem associated with the production of $H_2O_2$ by the electrochemical reduction of oxygen is that product yields have been too low for use in commercial applications. Although various improvements have been made in the direct synthesis of $H_2O_2$ from $H_2$ and $O_2$ by non electrochemical processes employing various catalysts, there is a dearth of literature addressing synthesis of $H_2O_2$ by means of electrochemical processes.

Fischer and Priess [Ber. 46, 698 (1913)] studied the reduction of $O_2$ to $H_2O_2$ at a gold sheet cathode.

M. S. Tarasevich, A. Sadowski and E. Yeager in "Comprehensive Treatise of Electrochemistry" Vol. 7, Ed. by B. E. Conway, J. O. M. Bockris, S. U. M. Khan and R. E. White (1983) at page 353 review prior work on the electroreduction of oxygen. Included is reference to a paper in which a ring/disc electrode was used to study the reduction of oxygen on platinum and palladium in acid solutions containing chloride or bromide.

V. S. Vilinskaya and M. R. Tarasevich "Electrokhimiya" Vol. 9, No. 8., 1187 (1973) (p. 1123 in the English Translation) study the effects of various absorbed anions and cations on oxygen reduction and conclude that the increase in surface coverage of the electrode by chemisorbed oxygen and ions leads to a decrease in available sites for the dissociative chemisorption of oxygen.

A review of cathodic reduction of oxygen is in W. C. Schumb, C. N. Satterfield and R. C. Wentworth, "Hydrogen Peroxide", Reinhold Publ. Co., New York, 1955, p. 66.

Advances in Catalytic Technologies: Novel Oxygenation Reactions, Catalytica ® Study No. 4186 (1986), prepared by Catalytica ®, 430 Ferguson Drive, Building 3, Mountain View, Calif. 94043 summarizes developments related to the cathodic reduction of oxygen to form hydrogen peroxide. In discussing recent kinetic studies related to the reduction of oxygen on carbon surfaces and the effect of basic and acidic surface groups on this process, it is pointed out that "Not surprisingly, since the unsuitability of acid electrolytes for $H_2O_2$ synthesis was demonstrated in early work, its use has been confined to kinetic studies." Id. at p. 13.

U S. Pat. No. 4,772,458 issued to Gosser et al. employs a catalytically effective amount of platinum, palladium or a combination thereof with an aqueous reaction medium comprising an acid component and a bromide promoter wherein the acid and bromide are provided in amounts to provide a molar ratio of hydrogen ion to bromide ion of at least about 2:1 in the reaction medium. Various other catalytic processes aimed at improving the process for the production of hydrogen peroxide by the direct combination of hydrogen and oxygen are discussed in the backgound section of U.S. Pat. No. 4,772,458 at columns one through three. This discussion is incorporated herein by reference.

John J. McKetta and William A. Cunningham, Encyclopedia of Chemical Processing and Design, Marcel Dekker, Inc., New York and Basel, 1986, Chapter 24, pages 1-26, "Fuel Cells" describe a variety of fuel cell structures. This discussion is incorporated herein by reference.

K. Otsuka and I. Yamanaka, One Step Synthesis of Hydrogen Peroxide Through Fuel Cell Reaction, Electrochimica Acta, Vol. 35, No. 2, pages 319-322, February 1990 describes a fuel cell system ($O_2$, HCl or $H_2SO_4$, M cathodes, Nafion-H Pt. anode, $H_2$) where M is Pt, Pd, Au, graphite or Au-mesh. It was found that less active materials such as Au-mesh were favorable electrodes for the synthesis (See page 320, col. 1).

SUMMARY OF THE INVENTION

The invention described herein concerns electrochemical processes for making hydrogen peroxide by means of the cathodic reduction of oxygen in the presence of an electrolytically conductive acid and halide reaction medium in an electrolytic cell.

The invention also concerns a process for making hydrogen peroxide by the cathodic reduction of oxygen in a fuel cell compartment containing an electrolytically conductive reaction medium comprising hydrogen ions, halide ions, preferably bromide ions, and molecular oxygen.

These processes operate so that the voltage at the cathode relative to a $Hg/Hg_2SO_4$ reference electrode is in the range of about $-0.2$ to about $-0.75$ volts.

DETAILED DESCRIPTION OF THE INVENTION

The present invention concerns improved electrochemical processes for making hydrogen peroxide from oxygen in a preferably substantially aqueous, electrolytically conductive, reaction medium, containing acid and halide, preferably acid and bromide, having an acidity of about $10^{-5}$ to 10M, preferably about $10^{-3}$ to about 2M and total halide ion concentration of about $10^{-7}$ to 2M. This reaction medium may be in the cathode compartment of a fuel cell. The processes are run so that the voltage at the cathode, relative to an $Hg/Hg_2SO_4$ reference electrode, is in the range of about $-0.2$ to about $-0.75$ volts and wherein molecular oxygen is reduced to hydrogen peroxide. The preferred voltage range for cathodes of Pd or Pt or their alloys is $-0.2$ to $-0.5$ volts.

The cathode is selected from the group consisting of Pd, Pt, Au and alloys of Pd, Pt and Au. Pd and Pt and their alloys are preferred.

As used herein, a halide promoter means any source capable of generating halide ions in the reaction medium. Where bromide is used, the ion concentration in the reaction medium is preferably no more than about 0.1M. Bromide is the preferred halide. The bromide ion may come, for example, from HBr or from a soluble metal bromide. Chloride or other compatible halides may also be present with the bromide in the reaction medium. Where bromide ions are used with a second halide, it is preferable that any compatible halide ions other than bromide ions be present in amounts not greater than that of the bromide ion. It is desirable to limit the concentration of halide in the final product, as halide free hydrogen peroxide is useful in certain commercial processes, particularly those involving electronic applications.

Suitable acids include hydrochloric, phosphoric, sulfuric, nitric, perchloric and a sulfonic acid, or a mixture thereof. Other protonic acids having a $pK_a$ less than about 8 can be used if they are compatible with the other components of the reaction medium. The concentrations of halide promoter and acid are interrelated so that the best results are achieved with relatively high acid concentrations while the halide concentrations are at the low end of the recited ranges.

Oxygen pressures should be about 1 to about 4000 psia (7 KPa to 28 MPa), preferably 14–1,500 psia (96 KPa to 10 MPa).

The process can generally be carried out at 0° C. to 90° C. and preferably about 0° C. to 50° C. However, lower temperatures may be employed as long as liquid freezing does not occur.

An advantage to the use of an all or substantially aqueous reaction medium is that explosion hazards associated with the combination of high hydrogen peroxide concentrations with organic solvents are avoided. By "substantially aqueous" is meant having no organic component present in the reaction mixture in excess of 2% by weight.

The invention is further described in the following examples wherein all parts and percentages are by weight and temperatures are in degrees Celsius. The concentration of $H_2O_2$ product was obtained by potentiometric titration with 0.1N ceric sulfate.

EXAMPLES 1–45

The electrolytic cell was a Princeton Applied Research coulometric system Model 377A, except that the platinum working electrode (about 25 square centimeters) was plated with palladium at 200 ma for 10 minutes in 2% $PdCl_2$ and 0.1N HCl solution. The plating procedure was repeated before Examples 41 to 45.

The cathode potential was maintained at various fixed values relative to a $Hg/Hg_2SO_4$ reference electrode having a potential of 0.395 volt vs. SCE. A Princeton Applied Research Model 173 potentiostat controlled the potential. A Model 179 coulometer monitored the coulombs passed through the cell. The current was recorded on a HP Model 7044A XY-recorder. The current often declined during a run but was usually in the range of 10 to 50 ma.

At the start of an experiment, 25 mL of 0.1N $H_2SO_4$ containing various concentrations of HBr was placed in the coulometric cell and the solution was continuously saturated with oxygen by bubbling $O_2$ through the cell. The potential of the Pd working electrode was controlled at a preset value by the Princeton Applied Research 173. After electrolysis the hydrogen peroxide content of the electrolyte was determined by potentiometric titration with 0.1N ceric sulfate solution. The results are summarized in the tables that follow. The hydrogen peroxide normality, N, is 2 times the molar concentration. The current efficiency is calculated by taking 96500 times the liquid volume in liters, in the cell, times the hydrogen peroxide normality and then dividing by the number of coulombs and multiplying the result by 100.

In Examples 46–52 (Tables II and III), relating to the electrochemical reduction of oxygen in the cathode compartment of a fuel cell, the Pt working electrode was plated with gold. Controls run with no halide ion in the system are shown in Experiments 1–12 (Table IV). The platinum working electrode was plated with gold by immersing the working electrode in a commercial soft gold plating bath and operating it as a cathode at 1 $mA/cm^2$ (an apparent area) for about 40 minutes. The temperature of the bath was 63° C. and its pH was 5.75. The thickness of the deposited gold was about 2.5 micrometers.

TABLE I

| Example No. | Working Electrode Potential (mV) | Coulombs | [HBr] M | Current Efficiency % | [$H_2O_2$] N |
|---|---|---|---|---|---|
| 1 | −750 | 100 | $1 \times 10^{-4}$ | 21.00 | .0087 |
| 2 | −650 | 100 | $1 \times 10^{-4}$ | 29.20 | .012 |
| 3 | −650 | 200 | $1 \times 10^{-4}$ | 24.50 | .020 |
| 4 | −550 | 100 | $1 \times 10^{-4}$ | 48.20 | .020 |
| 5 | −550 | 200 | $1 \times 10^{-4}$ | 40.70 | .034 |
| 6 | −500 | 100 | $1 \times 10^{-4}$ | 62.20 | .026 |
| 7 | −500 | 217 | $1 \times 10^{-4}$ | 51.20 | .046 |
| 8 | −450 | 100 | $1 \times 10^{-4}$ | 73.80 | .031 |
| 9 | −450 | 200 | $1 \times 10^{-4}$ | 62.00 | .051 |
| 10 | −450 | 400 | $5 \times 10^{-4}$ | 57.30 | .095 |
| 11 | −400 | 100 | $1 \times 10^{-4}$ | 79.50 | .033 |
| 12 | −400 | 200 | $1 \times 10^{-4}$ | 72.80 | .060 |
| 13 | −400 | 100 | $5 \times 10^{-4}$ | 88.50 | .036 |
| 14 | −350 | 100 | $1 \times 10^{-5}$ | 78.40 | .032 |
| 15 | −350 | 200 | $1 \times 10^{-5}$ | 68.30 | .058 |
| 16 | −350 | 575 | $1 \times 10^{-5}$ | 52.60 | .12 |
| 17 | −350 | 100 | $2 \times 10^{-5}$ | 82.69 | .034 |
| 18 | −350 | 100 | $1 \times 10^{-4}$ | 84.50 | .035 |
| 19 | −350 | 400 | $1 \times 10^{-4}$ | 68.10 | .11 |
| 20 | −350 | 580 | $1 \times 10^{-4}$ | 56.40 | .135 |
| 21 | −350 | 100 | $5 \times 10^{-4}$ | 83.10 | .034 |
| 22 | −500 | 100 | .005 | 71.10 | .0295 |
| 23 | −425 | 100 | .005 | 78.20 | .0324 |
| 24 | −400 | 100 | .005 | 81.93 | .0340 |
| 25 | −400 | 100 | .005 | 72.23 | .0328 |
| 26 | −375 | 300 | .005 | 69.45 | .0864 |
| 27 | −375 | 100.2 | .005 | 81.73 | .0339 |
| 28 | −350 | 100 | .005 | 78.35 | .0325 |
| 29 | −350 | 200 | .005 | 75.38 | .0625 |
| 30 | −375 | 100 | .00075 | 81.10 | $3.36 \times 10^{-2}$ |
| 31 | −375 | 400 | .00075 | 66.64 | $1.10 \times 10^{-1}$ |
| 32 | −375 | 100 | .00050 | 80.55 | $3.34 \times 10^{-2}$ |
| 33 | −375 | 100 | .00025 | 82.33 | $3.41 \times 10^{-2}$ |
| 34 | −375 | 100 | .00025 | 81.93 | $3.40 \times 10^{-2}$ |
| 35 | −375 | 100 | .00025 | 83.75 | $3.47 \times 10^{-2}$ |
| 36 | −375 | 100 | .00025 | 84.99 | $3.52 \times 10^{-2}$ |
| 37 | −375 | 103.3 | .00025 | 85.23 | $3.65 \times 10^{-2}$ |
| 38 | −375 | 400 | .00025 | 64.84 | $1.08 \times 10^{-2}$ |
| 39 | −375 | 610 | .00025 | 57.18 | $1.45 \times 10^{-2}$ |
| 40 | −375 | 100.7 | .00010 | 80.34 | $3.33 \times 10^{-2}$ |
| 41 | −375 | 1200 | .00025 | 47.26 | $2.35 \times 10^{-1}$ |
| 42 | −375 | 600 | .00025 | 66.72 | $1.66 \times 10^{-1}$ |
| 43 | −375 | 400.1 | .00025 | 74.25 | $1.23 \times 10^{-1}$ |
| 44 | −375 | 200.1 | .00025 | 83.09 | $6.89 \times 10^{-2}$ |
| 45 | −375 | 100 | .00025 | 88.26 | $3.66 \times 10^{-2}$ |

TABLE II 0.1 N $H_2SO_4$ + saturated $O_2$ and $5 \times 10^{-5}$ M HBr on Au
PAR Coulometric Cell Model 377A
(Gold Plated Pt-Screen Electrode)

| Example No. | mV (vs Hg/$Hg_2SO_4$) | Q coulombs | Efficiency % | $I_{av}$ ma | Normality $H_2O_2$ (in 35 ml) |
|---|---|---|---|---|---|
| 46 | −750 | 660 | 24 | 127 | 0.0459 |
| 47 | −750 | 412 | 32 | 121 | 0.0394 |
| 48 | −750 | 200 | 53 | 114 | 0.0312 |
| 49 | −750 | 100 | 65 | 105 | 0.0191 |

TABLE III 0.1 N HCL + saturated $O_2$ on Gold
PAR Coulometric Cell Model 377A
(Gold Plated Pt-Screen Electrode)

| Example No. | mV (vs Hg/$Hg_2SO_4$) | Q coulombs | Efficiency % | $I_{av}$ ma | Normality $H_2O_2$ (in 35 ml) |
|---|---|---|---|---|---|
| 50 | −750 | 635 | 29 | 107 | .0548 |
| 51 | −750 | 215 | 50 | 98 | .0320 |
| 52 | −750 | 100 | 67 | 98 | .0198 |

TABLE IV 0.1 N $H_2SO_4$ + saturated $O_2$ on Gold
PAR Coulometric Cell Model 377A
(Gold Plated Pt-Screen Electrode)

| Experiment No. | mV (vs Hg/$Hg_2SO_4$) | Q coulombs | Efficiency % | $I_{av}$ ma | Normality $H_2O_2$ (in 35 ml) |
|---|---|---|---|---|---|
| 1 | −450 | 300 | 41 | 48 | 0.0364 |
| 2 | −600 | 100 | 56 | 95 | 0.0166 |
| 3 | −600 | 200 | 45 | 103 | 0.0265 |
| 4 | −600 | 200 | 44 | 104 | 0.0255 |
| 5 | −600 | 400 | 26 | 107 | 0.0302 |
| 6 | −600 | 612 | 17 | 116 | 0.0305 |
| 7 | −700 | 200 | 35 | 139 | 0.0209 |
| 8 | −700 | 200 | 37 | 132 | 0.0217 |
| 9 | −800 | 200 | 24 | 154 | 0.0144 |
| 10 | −800 | 200 | 26 | 170 | 0.0153 |
| 11 | −800 | 215 | 28 | 163 | 0.1077 |
| 12 | −850 | 200 | 18 | 165 | 0.0105 |

As many differing embodiments of this invention may be made without departing from the spirit and scope thereof, it is to be understood that this invention is not limited to the specific embodiments described except as defined by the appended claims.

What is claimed is:

1. An electrochemical process for making hydrogen peroxide by the cathodic reduction of oxygen in an electrolytically conductive reaction medium comprising:
   (a) forming an electrolytically conductive reaction medium comprising halide ions, hydrogen ions and molecular oxygen; and
   (b) electrolyzing said medium through a cathode, and an inert anode, such that the voltage at the cathode relative to a Hg/$Hg_2SO_4$ reference electrode is in the range of about −0.2 to about −0.75 volts, whereby said molecular oxygen is reduced to hydrogen peroxide.

2. The process of claim 1 wherein the cathode is selected from the group consisting of Pd, Pt, Au and alloys of Pd, Pt and Au.

3. The process of claim 2 wherein the cathode is selected from Pd, Pt and alloys of Pd and Pt.

4. The process of claim 3 wherein the voltage at the cathode relative to a Hg/$Hg_2SO_4$ reference electrode is about −0.2 to −0.5 volts.

5. The process of claim 2 wherein the total halide ion concentration is not greater than 1M.

6. The process of claim 5 wherein the pressure of the oxygen is about 1 to about 4000 psia.

7. The process of claim 6 wherein the pressure of the oxygen is about 14 to 1,500 psia.

8. The process of claim 6 carried out at a temperature from about 0° C. to about 90° C.

9. The process of claim 1 wherein the halide ions are bromide.

10. The process of claim 9 wherein the concentration of bromide is about $1 \times 10^{-6}$ to about 0.1M.

11. The process of claim 1 wherein the halide ions are chloride.

12. The process of claim 11 wherein the concentration of chloride is $10^{-3}$ to 1M.

13. The process of claim 1 wherein the source of the hydrogen ions is an acid or mixture of acids selected from hydrochloric, phosphoric, sulfuric, nitric, perchloric acid and a sulfonic acid.

14. The process of claim 13 wherein the acid is present at a concentration of about $1 \times 10^{-4}$ to 1M.

15. The process of claim 1 wherein the halide ions are mixtures of bromide and chloride ions.

16. The process of claim 15 wherein the concentration of chloride ions is equal to or less than the concentration of bromide ions.

17. The process of claim 1 wherein the pKa of the acid component is less than 8.

18. An electrochemical process for making hydrogen peroxide by the reduction of oxygen in a cathode compartment of a fuel cell, this compartment having an electrolytically conductive reaction medium, comprising:
   (a) forming an electrolytically conductive reaction medium comprising halide ions, hydrogen ions and molecular oxygen; and
   (b) operating the fuel cell so that the voltage at the cathode relative to a Hg/$Hg_2SO_4$ reference electrode is in the range of about −0.2 to about −0.75 volts,
   whereby said molecular oxygen is reduced to hydrogen peroxide.

19. The process of claim 18 wherein the cathode is selected from the group consisting of Pd, Pt, Au and alloys of Pd, Pt and Au.

20. The process of claim 18 wherein the cathode is selected from Pd, Pt and alloys of Pd and Pt.

21. The process of claim 20 wherein the voltage at the cathode relative to a Hg/$Hg_2SO_4$ reference electrode is about −0.2 to about −0.5 volts.

22. The process of claim 18 wherein the total halide ion concentration is not greater than 1M.

23. The process of claim 22 wherein the halide ions are bromide.

24. The process of claim 23 wherein the concentration of bromide is about $1 \times 10^{-6}$ to about 0.1M.

25. The process of claim 18 wherein the pressure of the oxygen is about 1 to about 4000 psia.

26. The process of claim 25 wherein the pressure of the oxygen is about 14 to 1,500 psia.

27. The process of claim 18 carried out at a temperature from about 0° C. to about 90° C.

28. The process of claim 18 wherein the halide ions are chloride.

29. The process of claim 28 wherein the concentration of chloride is $10^{-3}$ to 1M.

30. The process of claim 18 wherein the source of the hydrogen ions is an acid or mixture of acids selected from hydrochloric, phosphoric, sulfuric, nitric, perchloric acid and a sulfonic acid.

31. The process of claim 30 wherein the acid is present at a concentration of about $1 \times 10^{-4}$ to 1M.

32. The process of claim 18 wherein the halide ions are mixtures of bromide and chloride ions.

33. The process of claim 32 wherein the concentration of chloride ions is equal to or less than the concentration of bromide ions.

34. The process of claim 18 wherein the pKa of the acid component is less than 8.

35. An electrochemical process for making hydrogen peroxide by the reduction of oxygen in a cathode compartment of a fuel cell, this compartment having an electrolytically conductive reaction medium, comprising:
   (a) forming an electrolytically conductive reaction medium comprising bromide ions, hydrogen ions and molecular oxygen; and
   (b) operating the fuel cell so that the voltage at the cathode relative to a $Hg/Hg_2SO_4$ reference electrode is in the range of about $-0.2$ to about $-0.75$ volts,
   whereby said molecular oxygen is reduced to hydrogen peroxide.

36. The process of claim 35 wherein the cathode is selected from the group consisting of Pd, Pt, Au and alloys of Pd, Pt and Au.

37. The process of claim 35 wherein the cathode is selected from Pd, Pt and alloys of Pd and Pt.

38. The process of claim 37 wherein the voltage at the cathode relative to a $Hg/Hg_2SO_4$ reference electrode is about $-0.2$ volts to about $-0.5$ volts.

39. The process of claim 35 wherein the bromide ion concentration is not greater than 1M.

40. The process of claim 39 wherein the pressure of the oxygen is about 1 to about 4000 psia.

41. The process of claim 40 wherein the pressure of the oxygen is about 14 to 1,500 psia.

42. The process of claim 39 wherein the concentration of bromide is about $1 \times 10^{-6}$ to about 0.1M.

43. The process of claim 35 carried out at a temperature from about 0° C. to about 90° C.

44. The process of claim 35 wherein the source of the hydrogen ions is an acid or mixture of acids selected from hydrochloric, phosphoric, sulfuric, nitric, perchloric acid and a sulfonic acid.

45. The process of claim 44 wherein the acid is present at a concentration of about $1 \times 10^{-4}$ to 1M.

46. The process of claim 35 wherein the pKa of the acid component is less than 8.

* * * * *